May 29, 1962  E. KUSTER  3,036,495
PHOTOGRAPHIC COPY POSITION APPARATUS
Filed Oct. 17, 1958

May 29, 1962  E. KUSTER  3,036,495
PHOTOGRAPHIC COPY POSITION APPARATUS
Filed Oct. 17, 1958  4 Sheets-Sheet 4

United States Patent Office 3,036,495
Patented May 29, 1962

3,036,495
PHOTOGRAPHIC COPY POSITION APPARATUS
Edwin Kuster, Zurich, Switzerland, assignor to Alos A.G., Zurich, Switzerland
Filed Oct. 17, 1958, Ser. No. 767,988
4 Claims. (Cl. 88—24)

This invention relates to photographic apparatus, and more particularly to devices adapted to define a picture taking area on a table or the like by light marks.

Apparatus is known which defines a picture taking area on a surface adapted for supporting a document or object to be photographed by means of points of light.

Apparatus according to the invention is principally characterized in that the light marks are reproductions of light rays transmitted through the associated camera lens.

The advantages of the invention are: no special optical projection system is required; no adjusting work is required; there is the possibility, by applying several light sources and/or by repositioning the light sources (which may be, for example, incandescent lamps), of marking a plurality of different image formats. Preferably four incandescent lamps are employed for marking a format; the corners of the format, or its length and width, may be marked on the middle axes, it being understood that more than four lamps may also be employed per format.

Further features of the invention will appear from the following description and claims, taken in conjunction with the accompanying drawing, wherein there are shown by way of example some preferred embodiments of the invention.

Figure 1:
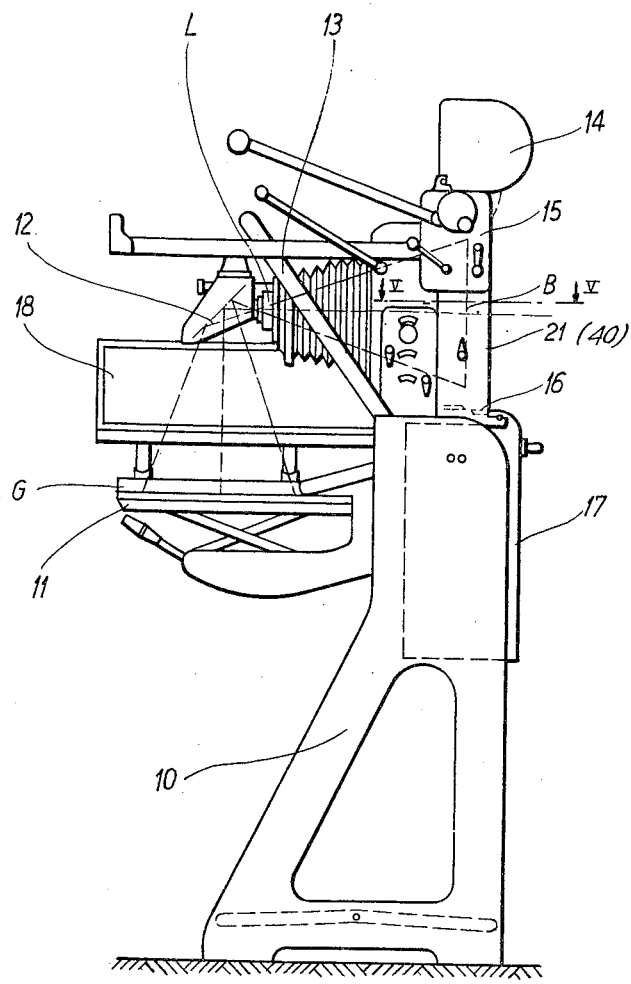
FIG. 1 is a side view of a photographic copying apparatus.

Referring more particularly to FIG. 1, the photographic copying apparatus has on a stand 10 a document-support table 11 which is vertically adjustable and defines the object plane G. The image plane B, in which the light-sensitive material lies, extends at right angles to the object plane G. A deviating mirror 12 reflects the light rays from the table 11 to the lens L. The apparatus is fitted with an automatic focusing device 13 by means of which the camera extension (distance lens/image plane) is positively adjusted for any height of the table 11 so that the well-known law of optical imagery $$\frac{1}{f}=\frac{1}{g}+\frac{1}{b}$$

is maintained and wherein $f$ designates the focal length of the lens used; $g$ denotes the distance of the object (distance object/lens); $b$ is the distance of the picture (camera extension).

The light-sensitive material, which may be paper or film, emerges from a magazine 14 by means of a feed mechanism 15 into a housing 21 that holds the light-sensitive material in the image plane B. Underneath the housing 21 are a cutting device 16 and a light-tight receiving box 17 for the exposed piece of the light sensitive material. Arranged at the side and over the table 11 is an illuminating device 18.

Figure 2:
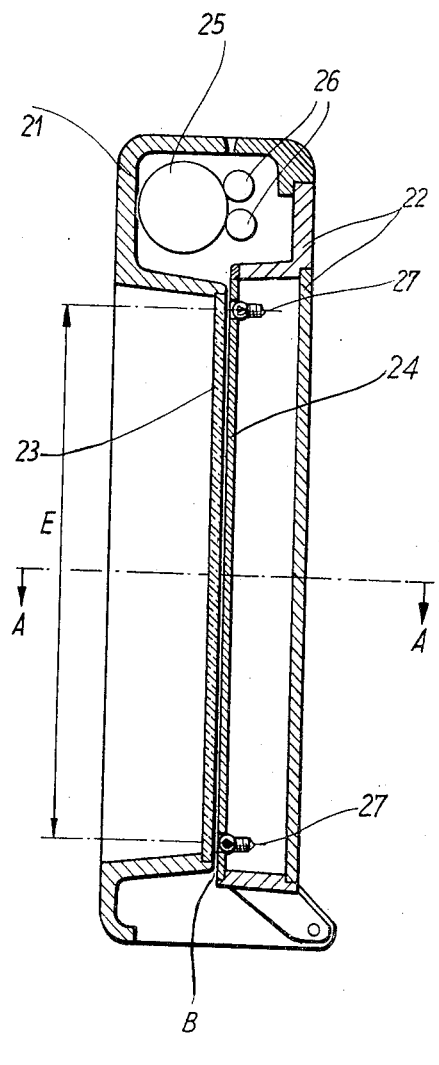
FIG. 2 is a vertical sectional view of a part of the same apparatus, on a larger scale.

In FIG. 2, which represents a sectional view of the housing 21 indicated in FIG. 1, a first form of the embodiment is shown. Only the parts necessary to explain the inventive idea are illustrated. In this embodiment, the small incandescent lamps are located somewhat outside the image-side focal plane B. The housing has a hinged rear wall 22. Inserted into the casing is a glass plate 23 which forms a small interspace with guide plate 24 into which the light-sensitive material is inserted. This material is normally located in the form of a roll in the magazine 14 indicated in FIG. 1, over the housing 21. The material is advanced into the interspace by the feed roller 25 (the drive of which is not shown), and by means of the two pressure rollers 26. Mounted on contact plate 24 are incandescent lamps 27 having filaments as near as possible to the image plane B and immediately behind the same. Through an aperture in the plate 24 the filament illuminates the camera lens. The spacing E of the lamps 27 is so chosen that their light rays are coincident in the image plane B with the upper and lower limits of the format.

Figure 3:
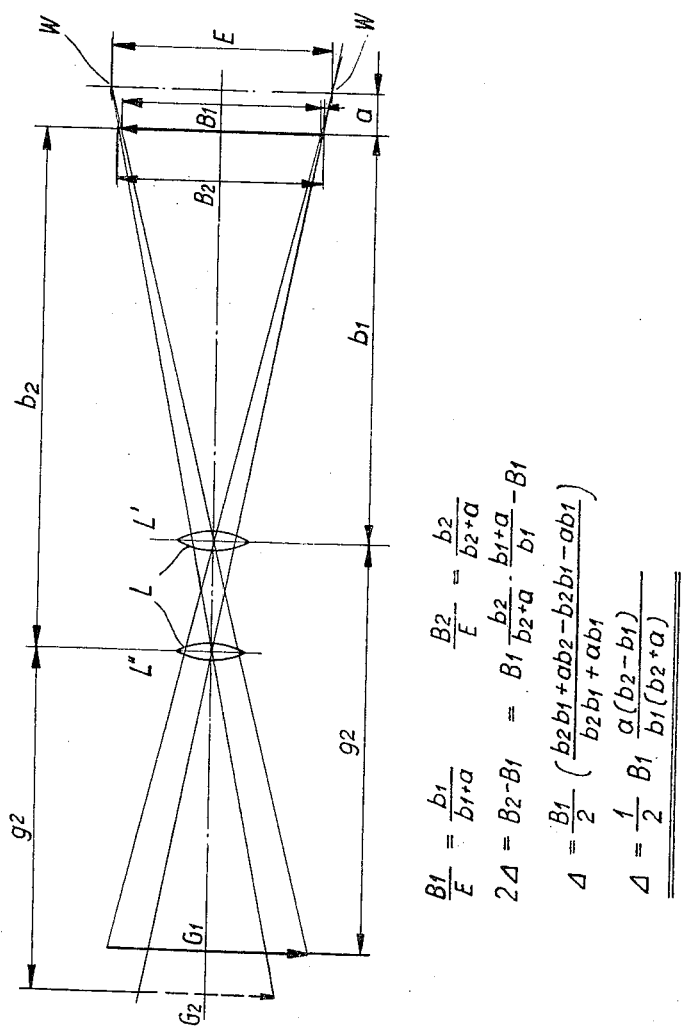
FIG. 3 is a diagrammatic representation of the optical path which exists during the producing of light marks.

FIG. 3 diagrammatically shows the optical path, wherein $L$=symbolic representation of the lens
$W$=filaments of the incandescent lamps
$B_1$ or $B_2$=image plane
$G_1$ or $G_2$=plane of the object
$b_1$ or $b_2$=distance image plane/lens
$g_1$ or $g_2$=distance object plane/lens
} for two different reproduction scales $E$=distance between the filaments
$a$=distance of the filament midpoints from the image plane
$\Delta$=half the difference of $B_2$ and $B_1$ If the filaments of the lamps are not exactly in the image plane, but lie somewhat outside, their spacing must be greater or smaller than the image size $B_1$ in order to properly mark this image size $B_1$ on the object plane $G_1$ for a certain definite position ($L'$) of the lens L. In another position ($L''$) of the lens L, that is with a different reproduction scale, due to the distance $a$ on the object plane $G_2$, the image size $B_1$ will no longer be marked, but the somewhat larger size $B_2$. The error thus caused in the marking accuracy amounts to $$\Delta=\frac{1}{2}B_1\frac{a(2-b_1)}{b_1(b_2+a)}$$

Under practical service conditions, this error is so small that it may be neglected. With a lens of the focal length $f$=210 mm. and a distance of 8 mm. of the filament midpoints from the image plane $B_1$, the error in the marking accuracy is only about ±0.75 mm., if the reproduction scale is altered within the limits of 0.6 to 1.7.

Figure 4:
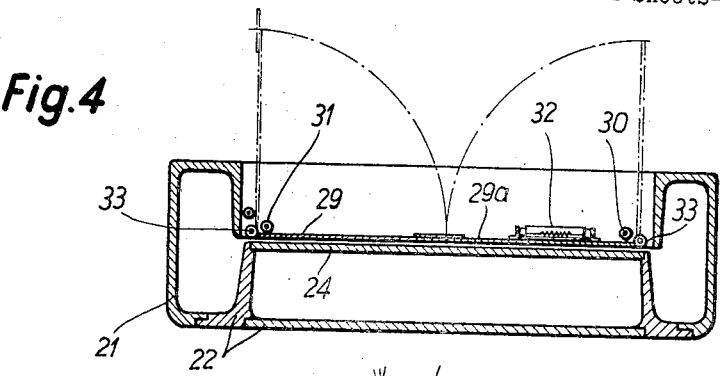
FIG. 4 is a horizontal sectional view of a part of a modified embodiment, taken on line A—A of FIG. 2.

FIG. 4 shows a modified embodiment in sectional view taken on the line A—A of FIG. 2. In this embodiment, the lamps 30, 31, 32 are not arranged behind the image plane, but somewhat in front thereof on pivoted doors 29, 29a which, when closed, cover the image plane lighttight and protect the light sensitive material from undesired illumination by the lamps. The doors 29 and 29a are hinged at pins 33 on the casing 21 and are raised to the chain-dotted line position immediately prior to an exposure. The incandescent lamps mounted on the doors are preferably of the tubular type. These have, on the one hand, the advantage of having a relatively small diameter so that the distance of the filament mid-point from the image plane is small, and thus the error in the marking accuracy becomes slight. On the other hand, the light mark on the document-support table, that is to say the image of the straight filament of the lamp is not a dot, but a dash, which increases the visibility. FIG. 4 shows a view of a lamp 32, and in cross-section two lamps 30, 31, which mark the width of the format.

Figure 5:
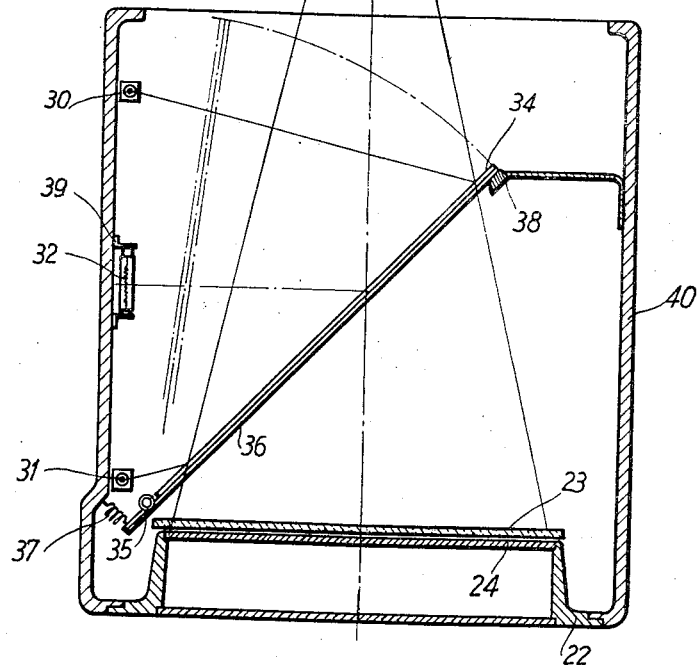
FIG. 5 is a similar horizontal section of another modification of the apparatus taken on the line V—V in FIG. 4.

In a further modification, the incandescent lamps are not arranged in the image plane, but outside the actual optical path, and are reflected by an additional mirror into the optical path of rays of the lens. This solution is represented in FIG. 5. A housing 40 similar to housing 21 of FIG. 1 is substituted therefor. Housing 40 is provided with a glass plate 23 and a hinged rear wall 22 with a guide plate 24. The light-sensitive material is inserted in the space between said plates 23 and 24. The housing 40 has a mirror 34 pivotally mounted therein on pins 35 which are fitted to a metallic holding sheet 36 having the mirror 34 affixed thereto. The mirror 34 and its metallic holding sheet 36 are urged by a spring 37 against an abutment 38 ensuring perfect effective positioning of the mirror. To obtain an exposure, the mirror 34 is raised into the ineffective chain-dotted line position and thus the light-sensitive layer is exposed to the path of rays. The actuating elements for raising the mirror are not shown in detail. On the left wall of the housing as seen in FIG. 5, are mounted tubular lamps 30, 31, 32 by fixtures 39.

The length of the center ray from the lamps to the lens, is exactly the same as the distance of the image plane from the lens so that the picture format will always be marked in exactly the corect size, independently of the position of the lens L. In addition, this solution has the advantage that the incandescent lamps are mounted in the stationary portion of the housing so that no loose electric leads are required.

In order to reduce the number of incandescent lamps required when marking many varied formats, the lamps may be arranged on movable slides to enable relocation of the lamps suitable for each picture format. Thus for instance, with an arrangement according to FIG. 6, for a definite format width, any desired format length may be altered by adjusting the vertical position of the two lamps 32.

Figure 6:
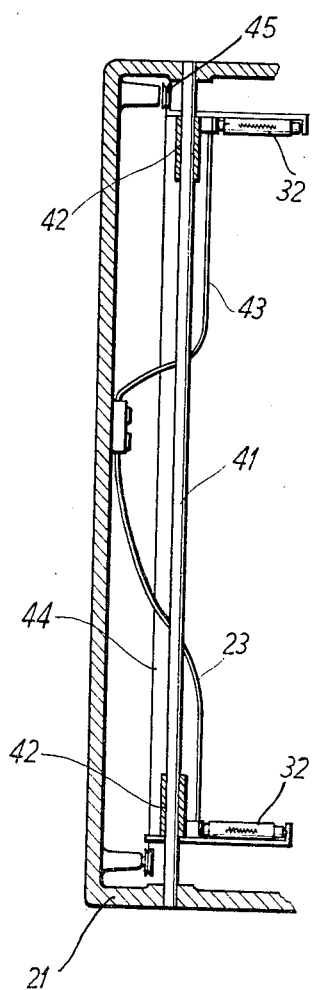
FIG. 6 is a fragmentary sectional view of a still further modified form of the apparatus.

In FIG. 6, numeral 41 designates a guide rail fixed within the housing 21, having two slides 42 movably arranged thereon. Attached to each slide is a tubular lamp 32 connected to the electric system via a flexible cable 43. A cord 44 enables adjustment of the slides, these being so fastened on the cord that turning of the cord pulley 45 causes them to move towards or away from each other symmetrically with respect to the center line. The cord 44 may additionally be coupled to other operating elements of the apparatus.

When adopting light-sensitive material which is in the form of rolls and drawn from the magazine into the housing 21, care must be taken to prevent any possibility of the material becoming prefogged by the lamps.

In the embodiments according to FIGS. 4 and 5, the light sensitive material may be permanently in the housing 21 or 40, protected by the doors 29, 29a or mirror 34 and holding sheet 36, respectively, against exposure to the light of the bulbs 30, 31, 32. Consequently, the light sensitive material is only exposed to the light rays during actual exposure.

In the embodiment according to FIG. 2 it is necessary, during projection of the light marks, to slide the light-sensitive material out of the housing 21 and back into the magazine and to mask the latter from outside light. Immediately prior to the exposure, the lamps are switched off each time the light-sensitive material is fed into the housing 21 and exposed to the light rays upon opening the shutter. After the exposure, the light-sensitive material is led further down until the entire exposed piece lies below the cutting device. After cutting (operation of a shear blade) the sheets falls into the receiving box.

It is understood that the foregoing detailed description is given merely by way of illustration and that other variation may be made therein without departing from the scope of the appended claims.

What I claim is:

1. In combination with a copy-projection apparatus including support means having a surface for supporting an object to be copied, and a camera including a lens for focusing an image of said object on a light sensitive recording medium, a device for indicating on said surface the proper position for said object to enable said lens to focus the image of said object on said medium, said device comprising a plurality of incandescent bulbs having filaments operatively disposed with respect to said lens so that images of the filaments are projected onto said surface through said lens.

2. A device as claimed in claim 1, wherein said camera comprises a housing adapted for guiding said medium along an image plane at which said lens focuses said image, said housing including a guide plate against which said medium is supported, said device further comprising a bulb support fixedly supporting said bulbs at positions removed from between said lens and guide plate, and a mirror pivotally supported with respect to said bulbs and pivotal between positions whereat the mirror is selectively displaced from between said lens and guide plate and positioned between the lens and guide plate to reflect light from said bulbs to said lens.

3. A device as claimed in claim 1 wherein said lens has a focal axis and the distance of said bulbs to said axis is substantially equal to the distance along said axis from said guide plate to said mirror with the latter in position to reflect light through said lens.

4. A device as claimed in claim 1 wherein said filaments are elongated to provide an elongated image.

References Cited in the file of this patent

UNITED STATES PATENTS

| 2,282,045 | Fleischer | May 5, 1942 |
| 2,859,532 | Fogg | Nov. 11, 1958 |
| 2,940,371 | Thurow | June 14, 1960 |

FOREIGN PATENTS

| 860,453 | Germany | Dec. 22, 1952 |
| 863,743 | Germany | Apr. 2, 1953 |